(12) United States Patent
Katikaneni et al.

(10) Patent No.: US 7,655,196 B2
(45) Date of Patent: Feb. 2, 2010

(54) REFORMING CATALYST AND METHOD AND APPARATUS FOR MAKING AND LOADING SAME

(75) Inventors: Sai P. Katikaneni, Brookfield, CT (US); Salvador E. Correa, Simsbury, CT (US); Edward H. Gladke, Southington, CT (US)

(73) Assignee: FuelCell Energy, Inc., Danbury, CT (US)

( * ) Notice: Subject to any disclaimer, the term of this patent is extended or adjusted under 35 U.S.C. 154(b) by 854 days.

(21) Appl. No.: 11/280,633

(22) Filed: Nov. 16, 2005

(65) Prior Publication Data

US 2007/0111055 A1    May 17, 2007

(51) Int. Cl.
*B01J 35/02* (2006.01)
*H01M 8/06* (2006.01)
*B32B 37/14* (2006.01)

(52) U.S. Cl. .................. 422/211; 156/219; 156/349; 156/500; 264/259; 429/20

(58) Field of Classification Search .................. 429/19, 429/20; 422/211; 264/259; 156/219, 349, 156/500
See application file for complete search history.

(56) References Cited

U.S. PATENT DOCUMENTS

| | | | |
|---|---|---|---|
| 2,921,845 A * | 1/1960 | Kyle et al. .............. 422/211 X |
| 4,328,130 A | 5/1982 | Kyan | |
| 4,388,277 A * | 6/1983 | Wright .................. 422/211 |
| 4,703,031 A * | 10/1987 | Unmuth et al. .......... 502/339 |
| 4,788,110 A * | 11/1988 | Bernard ................. 429/19 |
| 4,886,591 A | 12/1989 | Lalancette et al. | |
| 2001/0024628 A1 | 9/2001 | Bachinger et al. | |
| 2002/0108308 A1* | 8/2002 | Grieve .................. 48/197 R |
| 2004/0126288 A1 | 7/2004 | Fuju et al. | |
| 2004/0157104 A1* | 8/2004 | Huang et al. ............ 429/34 |
| 2008/0277315 A1 | 11/2008 | Ringer et al. | |

FOREIGN PATENT DOCUMENTS

| | | |
|---|---|---|
| CA | 2484919 | 4/2005 |
| EP | 0 677 327 | 10/1995 |
| JP | 2004-337659 | 12/2004 |
| WO | WO 2006/114320 | 11/2006 |

* cited by examiner

*Primary Examiner*—Stephen J. Kalafut
(74) *Attorney, Agent, or Firm*—Cowan, Liebowitz & Latman, P.C.

(57) ABSTRACT

A reforming catalyst member having an elongated body whose outer surface has a number of peak and valley regions so as to increase the area of the outer surface to enhance catalyst utilization. The catalyst member is adhered to a fuel cell current collector using an adhesive and dried using infrared radiation.

32 Claims, 7 Drawing Sheets

REFORMING CATALYST AND METHOD AND APPARATUS FOR MAKING AND LOADING SAME

BACKGROUND OF THE INVENTION

This invention relates to fuel cells and, in particular, to a reforming catalyst for use with such fuel cells.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

In internally reforming fuel cells, a reforming catalyst is placed within the fuel cell stack to allow direct use of hydrocarbon fuels such as methane, coal gas, etc. without the need for expensive and complex reforming equipment. In a reforming reaction, fuel cell produced water and heat are used by the reforming reaction, and the fuel is internally reformed to produce hydrogen for fuel cell use. Thus, the endothermic reforming reaction can be used advantageously to help cool the fuel cell stack.

Two different types of direct fuel cell assemblies have been developed. One type of reforming is indirect internal reforming, which is accomplished by placing the reforming catalyst in an isolated chamber within the stack and routing the reformed gas from this chamber into the anode compartment of the fuel cell. A second type of reforming is direct internal reforming. This type of reforming is accomplished by placing the reforming catalyst within the active anode compartment, which provides the hydrogen produced by the reforming reaction directly to the anode. In particular, the reforming catalyst for direct internal reforming is typically placed in corrugations of an anode current collector of the anode compartment. The reforming catalyst is usually available in various compacted solid shapes such as tablet, pellet, rod, ring or sphere form. Typical techniques for incorporating these types of catalysts in the corrugated anode current collector are described in U.S. Pat. No. 4,788,110. These techniques, however, are difficult to automate and are therefore not cost effective due to the small size of the catalyst particles. Moreover, the catalyst placed in the anode current collector using these techniques often shifts or spills during assembly, handling, transportation and operation.

To overcome these disadvantages, U.S. Patent Application Publication No. 2004/0157104, assigned to the same assignee herein, discloses a reforming catalyst formed as a continuous cord by extrusion and a method of loading this catalyst into the current collector which is automatically carried out in-situ using a PC controller, an extruder with a nozzle or head and an X-Y position table. However, while the catalyst cords formed using the method of the 2004/0157104 publication have an active surface area which provides a desired utilization of the catalyst, it would be beneficial to increase the active surface area to provide enhanced utilization. Moreover, the extrudate catalyst prepared using this method often may loosely adhere to the anode corrugations in which it is deposited. This can lead to curling and falling off of the catalyst from the corrugations. Providing a stronger bond between the catalyst and corrugations would therefore also be desirable.

It is therefore an object of the present invention to provide an improved reforming catalyst extrudate with enhanced diffusion and catalytic activity.

It is also an object of the present invention to provide a catalyst extrudate which results in materials costs reduction.

It is a further object of the present invention to provide a method of loading the catalyst extrudate which improves adhesion characteristics between the catalyst and the anode current collector corrugations.

SUMMARY OF THE INVENTION

In accordance with the embodiments of the invention described hereinafter, the above and other objectives are realized in a reforming catalyst member having an elongated body whose outer surface has a number of peak and valley regions so as to increase the area of the outer surface to enhance catalyst utilization. In the embodiments disclosed, the peak and valley regions follow in succession around the entire circumference of the body and each has a rounded peak and extends over the length of the body. Also in the disclosed embodiment, the elongated body is cylindrical and the succession of peak and valley regions results in the cylindrical body having a star-like cross-section.

Additionally disclosed are an extrusion assembly and a method for forming the reforming catalyst member. The extrusion assembly employs a mechanical press and a die head with a nozzle whose bore has the above-mentioned cross-section to realize the desired catalyst member. The method employs the steps of preparing a catalyst mixture using a catalyst and a binder in a carrier, extruding the catalyst mixture using the mechanical press and die head to form the catalyst member, and loading the catalyst member into preselected passages of an anode current collector.

The step of loading the catalyst member can be performed simultaneously with the step of extruding the catalyst mixture such that the catalyst member is aligned in the pre-selected passages as the catalyst member is formed by the mechanical press. The loading step can be performed using a servo drive and a software-controlled X-Y table.

The method of forming the catalyst member and loading the catalyst member can additionally comprise a step of pressing the anode current collector using a roller press following the loading step and prior to the drying step, and a step of calcining the catalyst member following the drying step. The calcining step may be performed in-situ in the fuel cell.

In further aspects of the invention, the drying of the catalyst member is carried out using infrared radiation and, prior to the loading step, a step of applying adhesive to the current collector is performed.

A direct reforming fuel cell incorporating the current collector is also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE INVENTION

Figure 1:
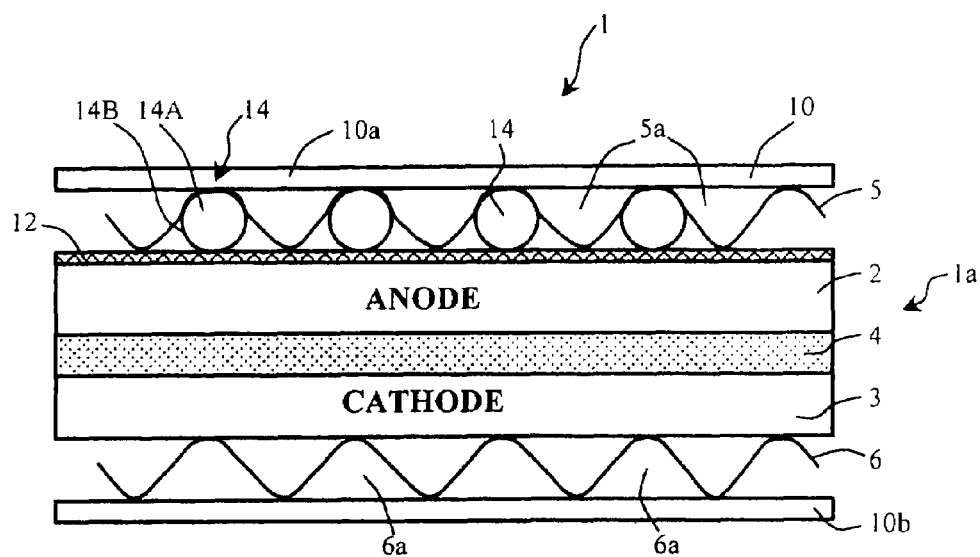
FIG. 1 shows a molten carbonate fuel cell with a reforming catalyst member in accordance with the principles of the present invention.

FIG. 1 shows a cross-sectional view of a portion of a fuel cell assembly 1. As shown, the fuel cell assembly 1 includes a fuel cell 1a comprising an anode electrode 2 and a cathode electrode 3 separated by an electrolyte matrix 4. The fuel cell 1a also includes an anode current collector 5 and a cathode current collector 6 which form gas passages 5a, 6a for fuel gas and oxidant gas, respectively. In the illustrative example shown in FIG. 1, the anode current collector 5 and the cathode current collector 6 are corrugated current collectors. The fuel cell assembly 1 also includes a plurality of bipolar separator plates 10 for separating adjacent fuel cells of the assembly from one another. In FIG. 1, the bipolar separator plate 10a separates the anode 2 and the anode current collector 5 of the fuel cell 1a from a fuel cell adjacent the anode side of the cell 1a, while the bipolar separator plate 10b separates the cathode 3 and the cathode current collector 6 of the cell 1a from a fuel cell adjacent the cathode side of the cell 1a.

In the case shown, the assembly 1 also includes an anode support member 12 separating the anode electrode 2 from the corrugated anode current collector 5. As also shown, the corrugated anode current collector 5 houses a direct reforming catalyst in a form of a plurality of reforming catalyst members 14 in the spaces or passages 5a defined by the corrugations of the current collector 5 between the current collector 5 and the bipolar plate 10a.

In FIG. 1, the reforming catalyst members 14 have a shape which provides increased surface area to thereby enhance utilization and efficiency of the catalyst. In particular, in this illustrative embodiment, each reforming catalyst member 14 comprises an elongated body 14A having an outer surface 14B which includes a number of peak and valley regions. In the present illustrative case the body 14A is also substantially cylindrical.

Figure 2:
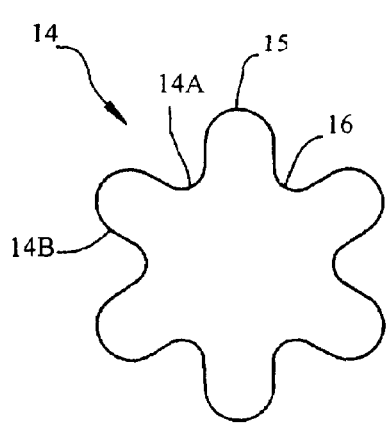
FIG. 2 shows a cross-section of the reforming catalyst member of FIG. 1.

FIG. 2 shows a cross-sectional view of each of the reforming catalyst member 14 taken transverse to the length of the body member 14A. As can be seen, the outer surface 14B of the body 14A has a succession of the peak and valley regions 15 and 16 around the circumference of the body. Each region is rounded at its vertex and the succession of regions result in a star-like cross-section for the body 14A. In the particular case shown, there are six peak regions 15 and six valley regions 16 resulting in a six point star cross-section. However, it is understood that the number of peak and valley regions may vary depending on a variety of factors, such as the cross-sectional size or thickness of the body 14A and the convenience of manufacturing.

As can be appreciated, the shape of the body 14A with the peak and valley regions 15 and 16 increases the geometric surface area of the catalyst member 14. This exposes the fuel gas passing through the passages 5a in the anode current collector of the fuel cell 1 to an increased surface area, which results in more fuel gas being reformed. As a result, a smaller amount (approximately 10% reduction) of catalyst is needed for fuel reforming, thereby reducing material costs for manufacturing and operating the fuel cell assembly.

Figure 4:
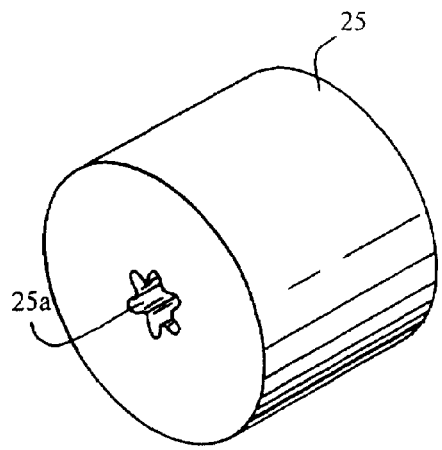
FIG. 4 shows an extrusion nozzle used in the extrusion assembly of FIG. 3.
Figure 3:
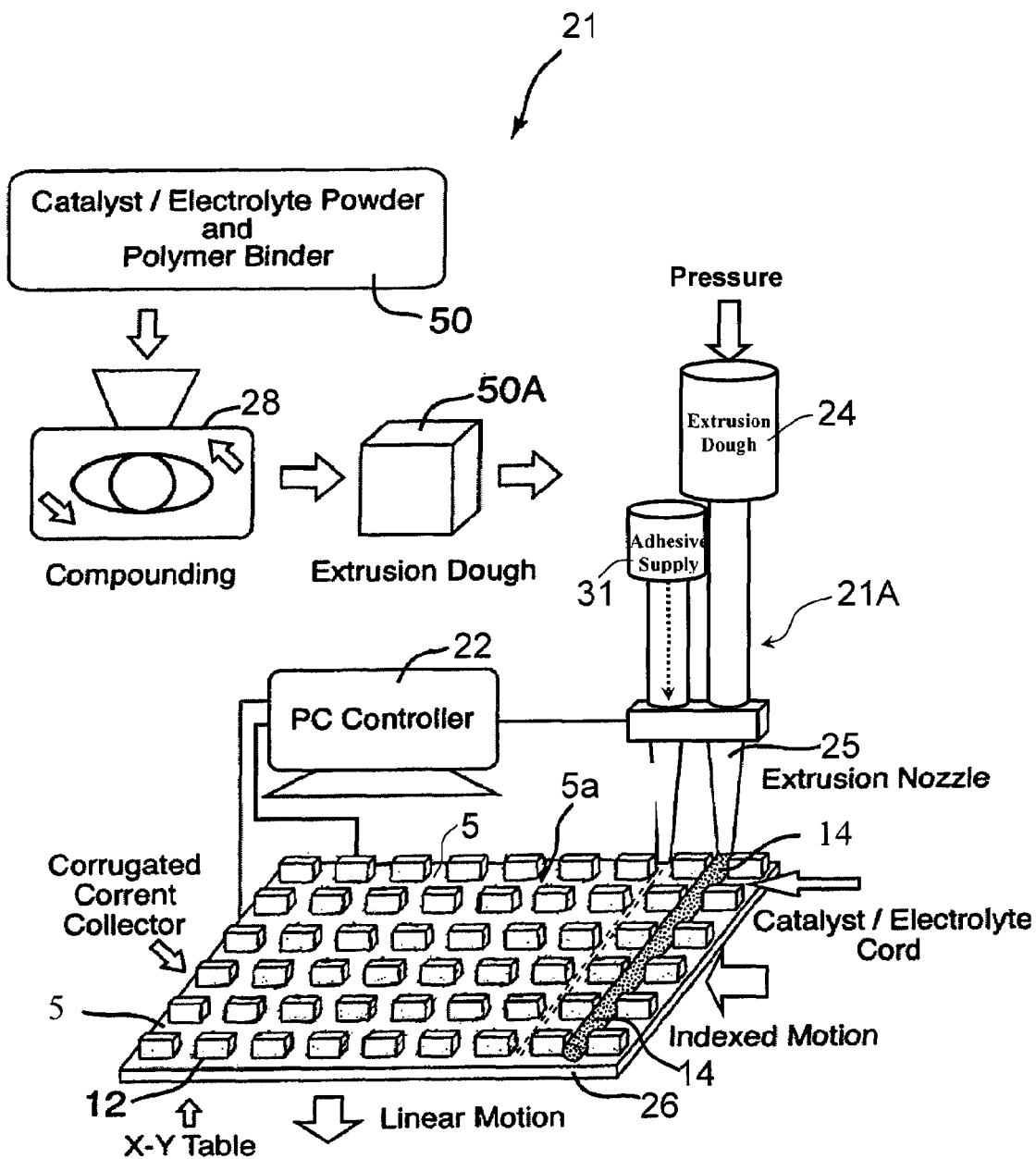
FIG. 3 shows a system including an extrusion assembly for forming the reforming catalyst member of FIGS. 1 and 2 and placing into the channels of a current collector.

FIG. 3 shows a system 21 including an extrusion assembly 21A for fabricating the reforming catalyst members 14 and loading the formed reforming catalyst members into the passages or channels 5a of the anode current collector 5. The assembly 21A includes a PC controller 22, an extruder 24 with a nozzle or head 25 and an X-Y position table 26. As shown in FIG. 4, the nozzle 25 includes an elongated cylindrical central bore 25a whose shape corresponds to the star-like cross-sectional shape of the catalyst body 14a shown in FIG. 2. As a result, as discussed more fully below, when a catalyst mixture is extruded through the bore 25a of the nozzle 25, the resulting catalyst member 14 will have the elongated cylindrical body 14A with the cross-sectional shape shown in FIG. 2.

In operation of the assembly of FIG. 3, the current collector plate 5 is first placed on the X-Y table 26 with its corrugations or legs defining the passages 5a facing toward the extruder nozzle 25. PC controller 22 then coordinates operation of the extruder 24 containing the catalyst loading material in dough form 50A and the X-Y table 26. Specifically, the extruder 24 is caused to extrude catalyst members 14 from the loading material through the nozzle 25, as the X-Y table 26 moves at a given speed and pattern to guide the extruded members 14 into the desired passages 5a of the plate 5. The extruded members 14 are preferably of a length $\geq 12"$.

The moving speed of the X-Y table 26 is determined according to the extrusion speed and required diameter of the body 14A. The moving pattern of the X-Y table 26 is, in turn, designed according to the desired loading pattern. As can be appreciated, various loading patterns can be generated via computer software for optimization of the loading process.

The loading material dough 50A is formed from catalyst material 50 comprised of a catalyst powder and a polymer binder. These materials are compounded or mixed in a mixer 28 to form a uniform extrudable mixture as the catalyst loading material dough 50A. The mixer 28 can be a high shear blade-mixer such as a planetary or a sigma mixer. The extrudable mixture will be discussed in more detail hereinbelow.

After the loading material dough 50A is formed by the mixing procedure, the dough is transferred into the extruder 24 for extrusion. As above-described, the catalyst members 14 are formed as the dough is extruded through the extruder nozzle 25 through the action of the extruder 24, which can be either a piston type or screw type extruder. As also above-described, the extrudate is guided into the passages 5a of the current collector plate 5 through the movement of the X-Y table 26.

The peak-to-peak diameter of each of the extruded bodies 14A depends on the current collector geometry and can be controlled through the nozzle size, extrusion speed and dough viscosity. Preferably, the diameter is selected such that the bodies can be caught in between the adjacent legs or corrugations forming the passages 5a of the current collector 5.

Figure 5:
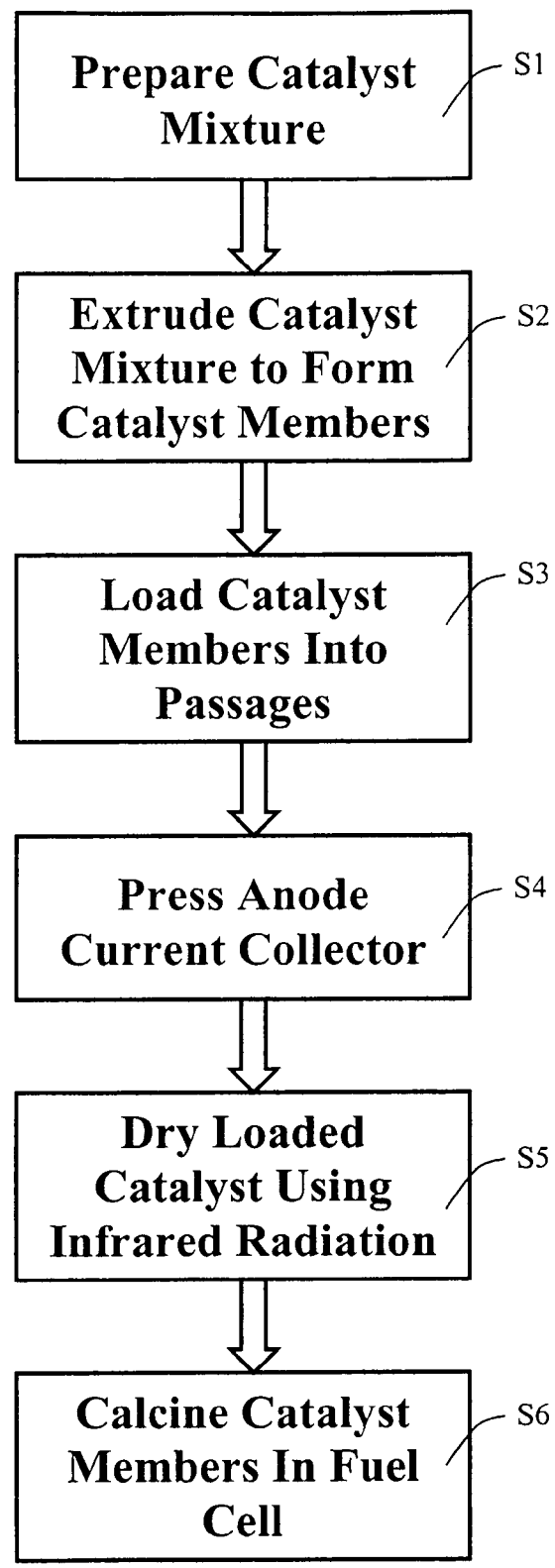
FIG. 5 shows a flow diagram of a method of operating the system of FIG. 3 and of further processing the resultant reforming catalyst loaded current collector.

The system of FIG. 5 can also be operated to realize graded catalyst loading in which the reforming catalyst members 14 are loaded into the anode current collector 5 at different densities, depending on the area of the anode current collector, so as to achieve cooling in pre-determined areas of the fuel cell. An example of such graded catalyst loading is described in a commonly assigned U.S. application Ser. No. 10/269,481, the entire disclosure of which is incorporated herein by reference. Graded catalyst loading, for example, can be realized by selective loading of the passages 5a. In particular, the catalyst can be loaded in every other passage or every third passage in different areas of the collector to realize loading of different densities.

The above has presented a general description of the formation of the reforming catalyst members 14 using the system 21. A more detailed description of a method of operation of the system 21 and of additional processing of the resultant reforming catalyst loaded current collector will now follow. FIG. 5 shows a flow diagram of the method.

In a first step S1, the catalyst loading material or dough mixture 50A is prepared using a predetermined amount of a catalyst and a predetermined amount of a binder which includes a carrier vehicle. Typical catalyst powders include nickel, nickel oxide supported on alumina or zirconia or a combination of these powders or a mixture of ceramic carriers. Where the catalyst comprises two or more catalyst powders, these catalyst powders are first mixed for at least 3 minutes to form a uniform dry mixed catalyst powder. The binder preferably comprises Camger 132-04 material, which includes 2.96 wt % PVA 523, 5.90 wt % PVA 203, 8.78 wt % glycerine, 0.13 wt % preservatives and 82.2 wt % water as the carrier vehicle. The weight ratio of the catalyst powder to the binder in the catalyst mixture is approximately 1.45:1 or greater. In addition, a predetermined amount of a solvent, such as acetic acid, may be used in preparing the catalyst mixture.

In this illustrative example, the catalyst mixture is prepared by mixing 1,000 grams of catalyst powder (with a defined particle size distribution), 689 grams of the binder and 10 grams of the acetic acid using the mixer 28. In particular, first, the catalyst powder is placed into the mixing bowl of the mixer and acetic acid is added to the catalyst powder in the mixing bowl using a metering pump or a dispenser bottle. The mixer is turned on for about 30 seconds at a 20 Hz speed to mix the catalyst powder with the acetic acid. Thereafter, the mixer is turned off and the binder is added to the mixture of the catalyst and acetic acid in the mixing bowl. The binder is then mixed with the mixture of the catalyst and acetic acid by first turning on the mixer for about 30 seconds at 20 Hz, and thereafter increasing the mixer speed to 100 Hz for approximately 4 minutes, or 240 seconds. During the mixing process, the mixer is maintained at a temperature between 50 and 65 degrees F. using a mixer chiller 18A which may be integrated with the mixer 18. When the binder is mixed with the mixture of the catalyst and acetic acid, the resulting catalyst formulation is in dough form 50A having a viscosity of approximately 300,000 cps.

In the second step S2, the catalyst mixture is extruded using the extruder 24 which, in this case, is a mechanical press extruder to form the catalyst members 14. Mechanical press extruders having a 25,000 Lbs range or higher are suitable for extruding the catalyst mixture. In particular, the catalyst mixture is first kneaded to remove any air pockets present therein and then placed into a extruding cylinder of the extruder. The cylinder is installed into the mechanical press extruder and extrusion is performed by increasing the force in the cylinder up to 15,000 Lbs to cause the catalyst mixture to pass through the nozzle 25, having the construction as shown in FIG. 4 as described above.

In the next step S3, as the catalyst members 14 are being formed in the second step, they are simultaneously loaded into the anode current collector 5 by placing the catalyst members 14 into the passages 5a of the collector via the PC controlled X-Y table 26. In the present illustrative case, a Gemini servo drive and Delta-Tau® Pmac-V 2.36 software are suitable for this automated process.

To this point, the method of FIG. 4 describes the steps as previously discussed above with respect to the operation of the system assembly 21. The discussion to follow includes a modification of the step S3 as well as additional steps to process the reforming catalyst loaded current collector 5.

More particularly, an adhesive may be applied to the passages 5a of the current collector preceding or simultaneously with the depositing of the extruded catalyst. In the system of FIG. 5, an adhesive supply 31 is situated so as to apply adhesive to the passage 5a immediately forward of the passage 5a receiving the reforming catalyst. In this way, when the X-Y table 26 is shifted to move the next passage in line to receive the catalyst extrudate, this passage will already have been supplied or coated with adhesive. The adhesive will then act to better adhere the resultant catalyst member 14 to the current collector channel.

Glue comprised of Camger Inc. 132-01 material is suitable for use as the adhesive for the supply 31. Camger Inc. 132-01 glue includes 5 wt % PVA 523, 11 wt % PVA 203, 16.3 wt % glycerine, 0.21 wt % preservatives and 67.49 wt % water.

Figure 6:
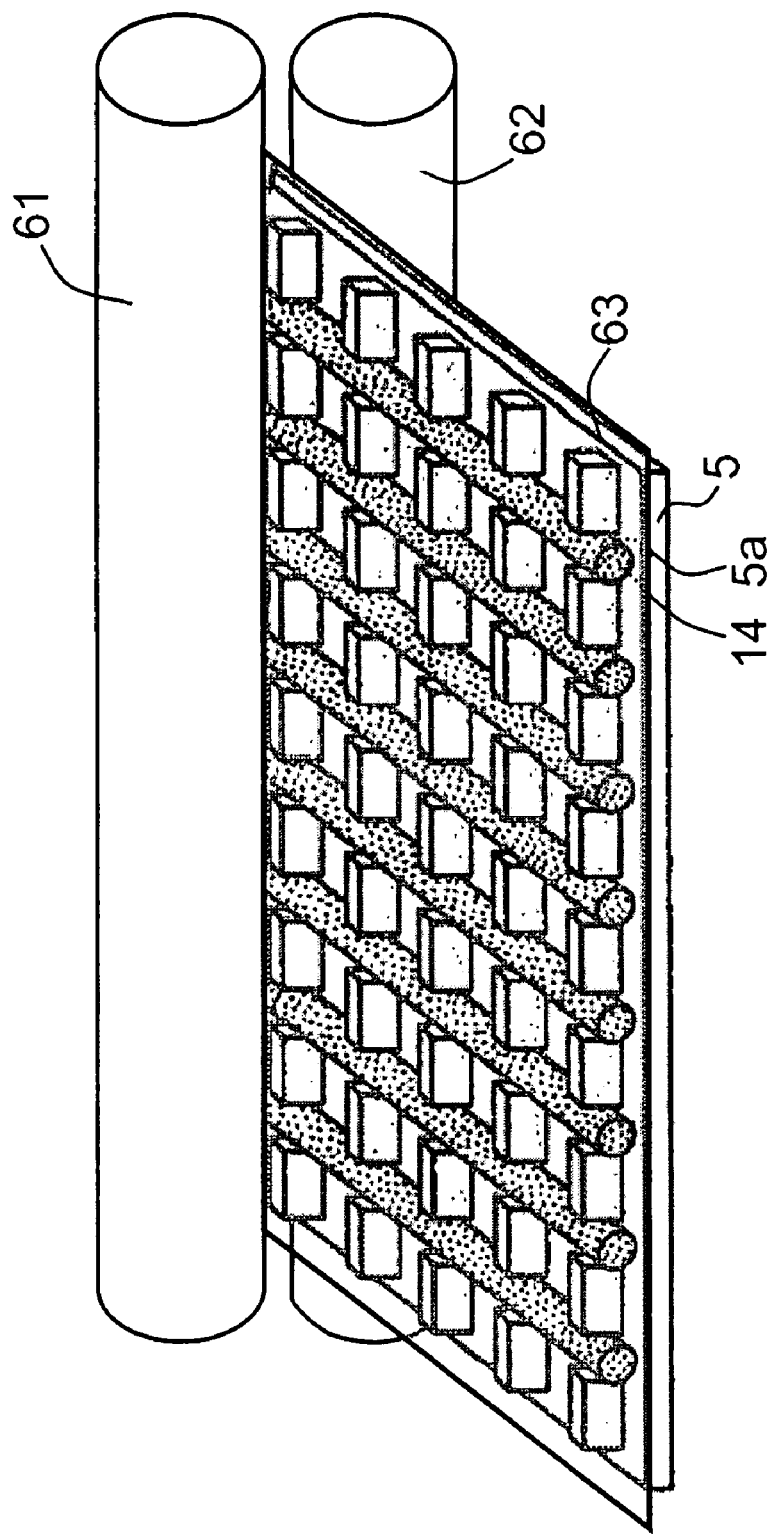
FIG. 6 illustrates equipment for pressing a current collector formed with the system of FIG. 3 in accordance with the method of FIG. 5.

After the reforming catalyst members are loaded into the pre-selected passages formed by the anode current collector 5, the anode current collector 5 is pressed using a roller press in a fourth step S4. This is illustrated in FIG. 6 which shows the catalyst loaded current collector 5 being pressed by a roller press without altering the star-like cross section of the catalyst. In FIG. 6, only the rollers 61 and 62 of the roller press are actually shown. In particular, the rollers 61 and 62 undergo horizontal translation with the current collector 5 therebetween to provide the necessary compression of the catalyst members 14 against the surfaces of the current collector passages 5a. Also shown is a plastic sheath 63 applied over the collector 5 to protect the collector during this processing. As can be appreciated, the pressing of the current collector 5 in this fashion causes the catalyst members 14 to be pressed into the adhesive in the passages so that the members better adhere to and are retained by the passages.

Figure 7:
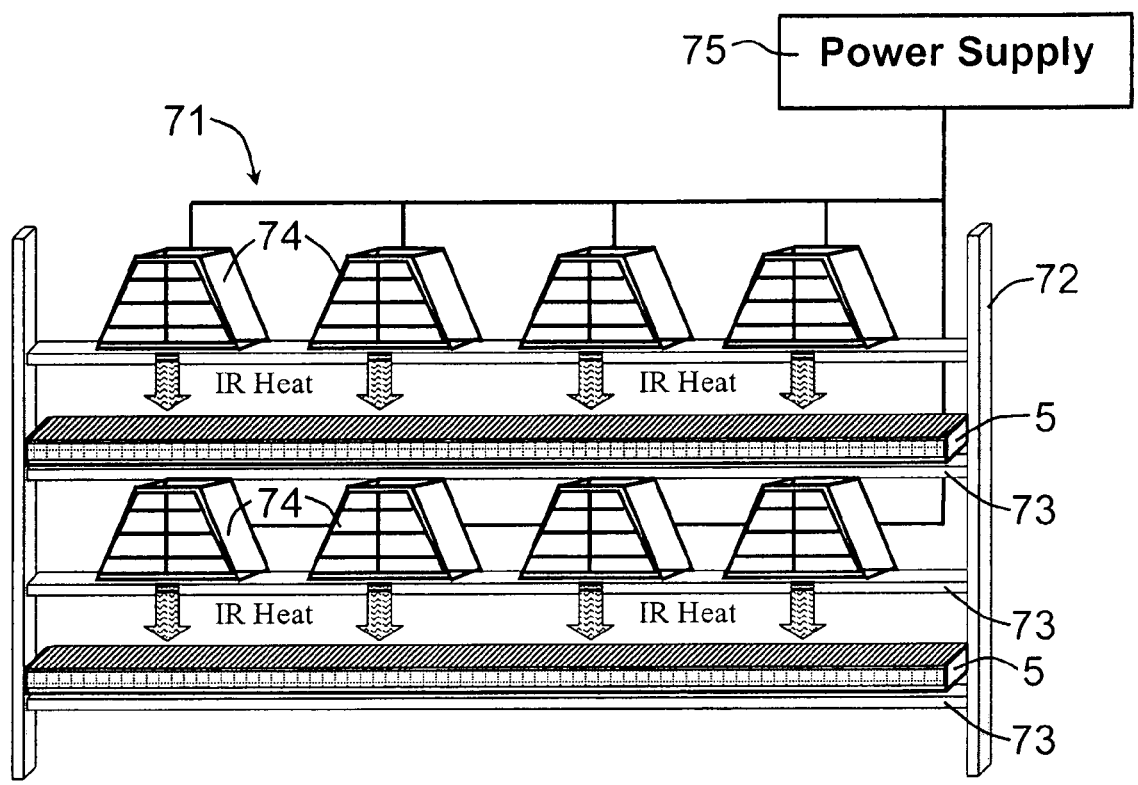
FIG. 7 illustrates a drying assembly for drying the reforming catalyst loaded current collector in accordance with the method of FIG. 5.

In the next step S5, the catalyst loaded current collector 5 is subjected to a heating process to dry the catalyst members 14. This is shown in FIG. 7 by the heating and drying assembly 71. As shown, the assembly 71 includes a rack 72 having shelves 73. On alternate shelves of the rack are disposed catalyst loaded current collectors 5 and assemblies of spaced infrared (IR) heating units 74. The heating units are supplied with electrical current from a power supply 75. This causes the units to radiate IR energy which, in turn, heats the reforming catalyst members in the current collectors 5 to dry the catalysts members.

Typically, the heating time is about 12 minutes. Also, the heating units may be color temperature type infrared heaters. In particular, Fostoria FHK 1600-degree color temperature infrared heaters are suitable.

Because air is virtually transparent to IR radiation, IR radiation provided by the assembly 71 is not scattered or absorbed before reaching the surface of the catalyst members. As a result, substantially all the IR radiation is absorbed by the catalyst members and turns into heat. This dries the catalyst members and promotes adherence of the catalyst members to the surface of the current collectors 5. This, in turn, prevents curling or removal of the catalyst members from the current collectors and therefore extends the performance of the reforming catalyst members over the operating time of the fuel cell assembly.

In a final step S6, the reforming catalyst members formed, loaded and dried in the anode current collector 5 as described above, and incorporated into the fuel cell 1a, are calcined in situ in the fuel cell assembly 1 during its operation. This process causes the organic binders present in the catalyst members to be removed, thereby resulting in the reforming catalyst members having a desired pore size and surface area. The physical characteristics of the reforming catalyst members prepared using the above method and of the conventional reforming catalyst are summarized in Table 1:

TABLE 1

| Catalyst | Activity | Sulfur (ppm) | Carbon (%) | XRD | Total Intrusion Vol. | Avg. Pore Diameter | Porosity (%) | BET | Ni Surface Area | Dispersion (%) |
|---|---|---|---|---|---|---|---|---|---|---|
| Invention | 23.73 | 230 | 0.45 | 35 Å | 0.5361 | 0.104 | 71.8453 | 185 | 25.1737 | 6.4022 |
| Conventional | 15.55 | 230 | 0.45 | 150 Ao | 0.355 | 1.0 | 65.00 | 175 | 22.00 | 6.0 |

Figure 8:
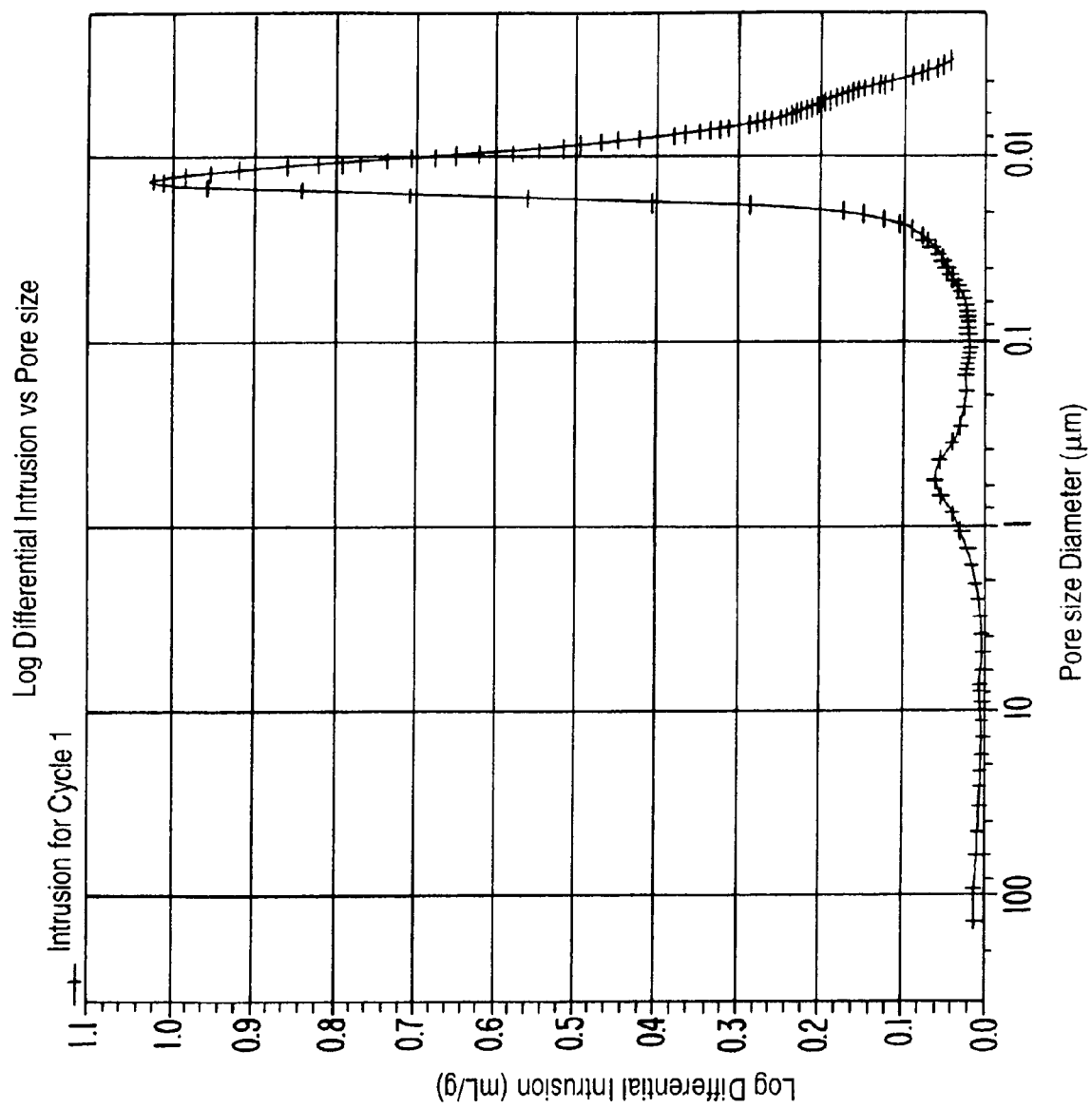
FIG. 8 shows a graph of pore size distribution of the reforming catalyst member formed in accordance with the method of FIG. 5.

In addition, the pore size distribution of the reforming catalyst members formed and loaded into the anode current collector passages using the method of FIG. 5 and calcined in the fuel cell assembly was measured. Pore size distribution has significantly improved using Camger, Inc. 132-04 binder, providing more small pores with higher diffusivity and lower deactivation of the catalyst with time. Pore size distribution of the extruded and burn out catalyst is shown in FIG. 8. FIG. 8 shows a graph of this distribution. In FIG. 8, the X-axis represents the pore size diameter in μm, while the Y-axis represents a log differential intrusion in L/mg. As shown in FIG. 8, the average pore diameter is less than 0.1 μm, with a peak pore sizes being between 0.05 and 0.005 μm. Such pore size distribution results in a defined pore size structure of the catalyst member and stable reforming activity.

Figure 9:
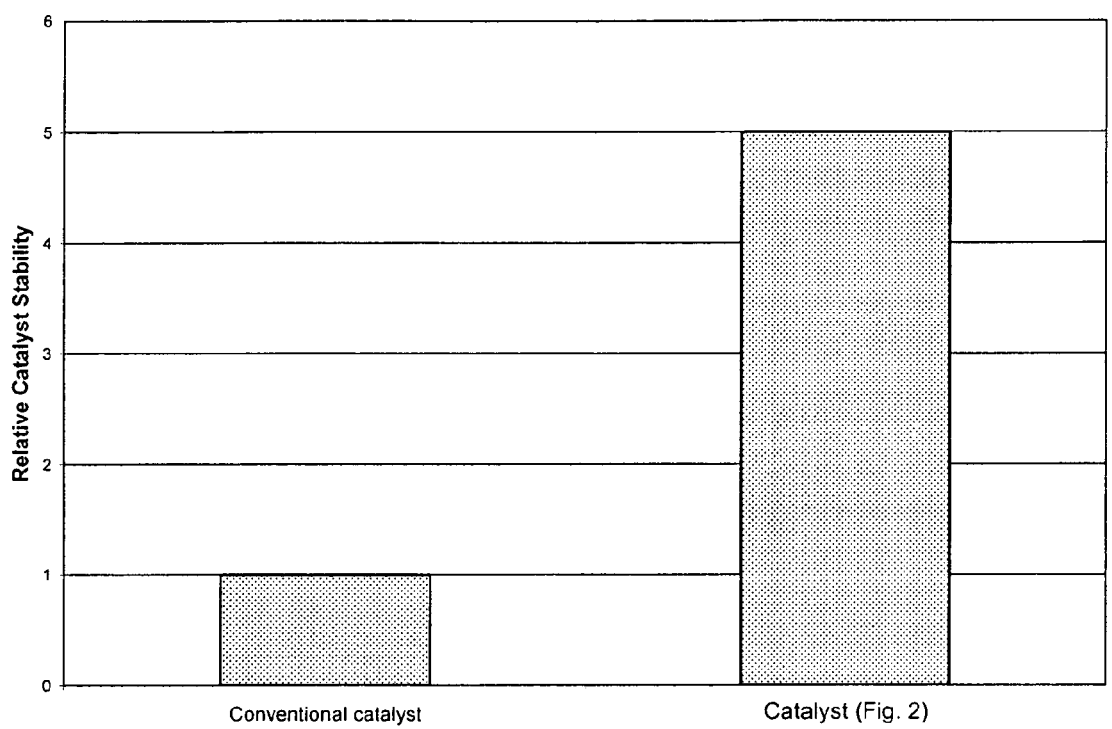
FIG. 9 shows a graph of relative performance of a reforming catalyst member formed in accordance with the method of FIG. 5 and of a conventional reforming catalyst member.

The performance of the reforming catalyst members 14 of the invention was compared with the performance of the conventional reforming catalysts. FIG. 9 shows a graph of relative performance of the reforming catalyst prepared using the method of FIG. 5 compared with relative performance of the conventional reforming catalyst. In FIG. 9, the Y-axis represents the relative catalyst stability which is directly related to the relative performance of the catalyst. As can be seen, the relative stability of the reforming catalyst members prepared in accordance with the invention is about 4-5 times greater than the stability of the conventional catalyst. The increase in stability, and thus the improved performance, of the reforming catalyst of the invention is the result of the improved structure and processing of the catalyst members, as discussed above.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention, as defined by the accompanying claims. For example, the peak and valley regions of the catalyst members 14 can be varied so as to provide a cross-sectional shape other than star-shape, and still realize enhanced performance due to the increased surface area provided by the peaks and valleys. Also, catalyst members with a star-shaped cross-section and an annular void can provide additional enhanced performance.

What is claimed is:

1. An assembly comprising:
   a reforming catalyst member having an elongated body whose outer surface has a number of peak and valley regions, thereby increasing the area of the outer surface of the body to enhance catalyst utilization; and
   a fuel cell current collector on which the reforming catalyst member is disposed,
   wherein said reforming catalyst is adhered to said current collector using an adhesive and dried using infrared radiation with said catalyst retained in said current collector.

2. An assembly in accordance with claim 1, wherein said fuel cell current collector has one or more corrugations and said catalyst member is disposed in one or more of said corrugations.

3. An assembly in accordance with claim 2, further comprising:
   an anode;
   a cathode;
   and an electrolyte matrix disposed between said anode and said cathode;
   said fuel cell current collector being an anode current collector and being situated adjacent said anode and the corrugations of said fuel cell current collector forming a plurality of passages for passing fuel gas.

4. An assembly in accordance with claim 3, wherein said body is an IR dried extrudate.

5. An assembly in accordance with claim 4, wherein said peak and valley regions follow in succession around the circumference of the body and each extends along the length of the body.

6. An assembly in accordance with claim 5, wherein said body is substantially cylindrical, said peak and valley regions are rounded and such that said body has a star-like cross-section.

7. An assembly in accordance with claim 6, wherein said extrudate is formed from a dough comprising catalyst powder and a binder including a carrier vehicle.

8. An assembly in accordance with claim 7, wherein said catalyst powder comprises one or more of nickel, nickel oxide, alumina, zirconia and a mixture of ceramic carriers.

9. An assembly in accordance with claim 1, wherein said body is an IR dried extrudate.

10. A method comprising:
   providing a reforming catalyst material for reforming fuel;
   forming said catalyst material into a reforming catalyst member having an elongated body whose outer surface has a number of peak and valley regions, thereby increasing the area of the outer surface of the body to enhance catalyst utilization;
   loading said reforming catalyst member onto a fuel cell current collector, said loading including adhering said reforming catalyst member to said fuel cell current collector using an adhesive; and
   drying said reforming catalyst member using infrared radiation with said reforming catalyst member retained in said current collector.

11. A method in accordance with claim 10, wherein:
said providing comprises preparing a catalyst mixture using at least a catalyst and a binder having a carrier vehicle;
said forming comprises extruding said catalyst mixture using an extruder with a die head having a bore whose inner surface conforms to said outer surface of said body to form said catalyst member.

12. A method in accordance with claim 11, wherein:
said carrier vehicle includes water.

13. A method in accordance with claim 12, wherein:
said loading step comprises applying an adhesive to said fuel cell current collector in the areas where said catalyst member is to be or is being loaded prior to or at the time of loading said reforming catalyst member onto said current collector.

14. A method in accordance with claim 13, wherein:
said fuel cell current collector has one or more corrugations and said loading is in one or more of said corrugations.

15. A method in accordance with claim 14, wherein:
said loading includes moving said fuel cell current collector on a computer controlled X-Y table.

16. A method in accordance with claim 15, further comprising:
compressing said fuel cell current collector after said loading.

17. A method in accordance with claim 16, further comprising:
calcining said catalyst member after said compressing of said fuel cell current collector.

18. A method in accordance with claim 15, further comprising:
assembling an anode electrode, an electrolyte matrix and a cathode electrode so that said electrolyte matrix is between said anode and cathode electrodes and situating said fuel cell current collector adjacent said anode electrode anode and adding additional components to form a fuel cell;
and operating said fuel cell.

19. A method comprising:
providing a reforming catalyst material for reforming fuel;
forming said catalyst material into a reforming catalyst member; loading said reforming catalyst member onto a fuel cell current collector, said loading including adhering said reforming catalyst member to said fuel cell current collector using an adhesive; and
drying said catalyst member using infrared radiation with said reforming catalyst member retained in said current collector.

20. A method in accordance with claim 19 wherein:
said providing comprises preparing a catalyst material by mixing at least a catalyst and a binder having a carrier vehicle.

21. A method in accordance with claim 20 wherein:
said carrier vehicle includes water.

22. A system comprising:
a supply providing a reforming catalyst material for reforming fuel;
and a unit for forming said catalyst material into a reforming catalyst member having an elongated body whose outer surface has a number of peak and valley regions, thereby increasing the area of the outer surface of the body to enhance catalyst utilization;
wherein said unit includes a loading assembly for loading said reforming catalyst member onto a fuel cell current collector and adhering said reforming catalyst member to said fuel cell current collector using an adhesive, and said unit further comprises an IR drying assembly using IR radiation to dry said catalyst member with said catalyst member retained in said current collector.

23. A system in accordance with claim 22 wherein:
said supply comprises a mixer for mixing a catalyst and a binder having a carrier vehicle to form said catalyst material; and
said unit includes an extruder with a die head having a bore whose inner surface conforms to said outer surface of said of said body, said extruder receiving said catalyst material and extruding said catalyst material through said bore of said die head to form said catalyst member.

24. A system in accordance with claim 23, wherein:
said carrier vehicle includes water.

25. A system in accordance with claim 24, wherein;
said loading assembly supports a fuel cell current collector so that said fuel cell current collector receives said catalyst member when said catalyst member is formed by said extruder and prior to said catalyst member being dried by said drying assembly.

26. A system in accordance with claim 25 wherein:
said unit further comprises an adhesive supply supplying an adhesive to said fuel cell current collector in the areas where said catalyst member is to be or is being loaded for adhering said catalyst member to said current collector.

27. A system in accordance with claim 26, wherein:
said fuel cell current collector has one or more corrugations and said loading is in one or more of said corrugations.

28. A system in accordance with claim 27, wherein:
said loading assembly includes a computer controlled X-Y table upon which said current collector is placed.

29. A system in accordance with claim 28, wherein:
said unit further includes a compressing assembly for compressing said fuel cell current collector after said loading of said fuel cell current collector.

30. A system comprising:
a supply providing a reforming catalyst material for reforming fuel;
a unit forming said catalyst material into a reforming catalyst member;
wherein said unit includes a loading assembly for loading said reforming catalyst member onto a fuel cell current collector and adhering said reforming catalyst member to said fuel cell current collector using an adhesive; and
an IR drying assembly using IR radiation to dry said catalyst member with said catalyst member retained in said current collector.

31. A system in accordance with claim 30, wherein:
a catalyst material is a mixture of at least a catalyst and a binder having a carrier vehicle.

32. A system in accordance with claim 31, wherein:
said carrier vehicle includes water.

\* \* \* \* \*